United States Patent
Ji et al.

(10) Patent No.: US 7,656,882 B2
(45) Date of Patent: Feb. 2, 2010

(54) METHOD AND SYSTEM FOR PEAK SCHEDULING IN A WIRELESS NETWORK

(75) Inventors: Baowei Ji, Richardson, TX (US); Cornelius van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 11/476,539

(22) Filed: Jun. 28, 2006

(65) Prior Publication Data

US 2008/0002712 A1  Jan. 3, 2008

(51) Int. Cl.
*H04L 12/56* (2006.01)

(52) U.S. Cl. .................... 370/395.4; 370/335

(58) Field of Classification Search ........... 370/329, 370/252, 395, 335, 241; 709/200
See application file for complete search history.

(56) References Cited

U.S. PATENT DOCUMENTS

| 7,006,466 | B2* | 2/2006 | Borst et al. ............... 370/329 |
| 7,474,627 | B2* | 1/2009 | Chheda et al. ............ 370/252 |
| 2004/0210619 | A1* | 10/2004 | Balachandran et al. ...... 709/200 |
| 2005/0063389 | A1* | 3/2005 | Elliott et al. ............ 370/395.4 |
| 2005/0141461 | A1* | 6/2005 | Hosein et al. ............ 370/335 |
| 2005/0201296 | A1* | 9/2005 | Vannithamby et al. ...... 370/241 |

* cited by examiner

*Primary Examiner*—Kwang B Yao
*Assistant Examiner*—Syed Bokhari (57) ABSTRACT

A method of providing peak scheduling in a wireless network is provided. The method includes determining a priority for each of a plurality of users in the network based on a throughput window of a finite length and scheduling the users based on the priority.

16 Claims, 5 Drawing Sheets

METHOD AND SYSTEM FOR PEAK SCHEDULING IN A WIRELESS NETWORK

TECHNICAL FIELD OF THE INVENTION

The present disclosure relates generally to wireless communications and, more specifically, to a method and system for peak scheduling in a wireless network.

BACKGROUND OF THE INVENTION

In many wireless networks, multi-user diversity gain and fairness are achieved through the use of proportional fairness scheduling (PFS). In providing this type of scheduling, the packet scheduler generally schedules the user with the highest priority as determined based on a ratio of the instantaneous capacity for the user versus the average throughput for the user as compared to the same ratio for the other users. However, using conventional PFS, the packet scheduler typically schedules a user substantially at the ascending side of the channel fading curve for the user and rarely at the descending side. Thus, this type of scheduling results in serving the user in suboptimal conditions during nearly half of the best opportunities for the user and may result in low throughput. Therefore, there is a need in the art for improved scheduling in wireless networks.

SUMMARY OF THE INVENTION

A method for peak scheduling in a wireless network is provided. According to an advantageous embodiment of the present disclosure, the method includes determining a priority for each of a plurality of users in the network based on a throughput window of a finite length and scheduling the users based on the priority.

According to another embodiment of the present disclosure, a method of providing peak scheduling in a wireless network is provided that includes defining a finite length for a throughput window. A scheduling ratio is determined for each of a plurality of users in the network based on the throughput window. The users are prioritized based on the scheduling ratios. The users are scheduled based on the prioritization of the users. A determination is made regarding whether a change in conditions for the network has surpassed a predetermined threshold, and when the change in conditions for the network has surpassed the predetermined threshold, the length of the throughput window is modified.

According to yet another embodiment of the present disclosure, a base station capable of providing peak scheduling in a wireless network is provided that includes a packet scheduler. The packet scheduler is operable to provide double-sided scheduling for each of a plurality of users in the network by scheduling each of the users both at a substantial portion of an ascending slope of a channel fading curve for the user and at a substantial portion of a descending slope of the channel fading curve for the user.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
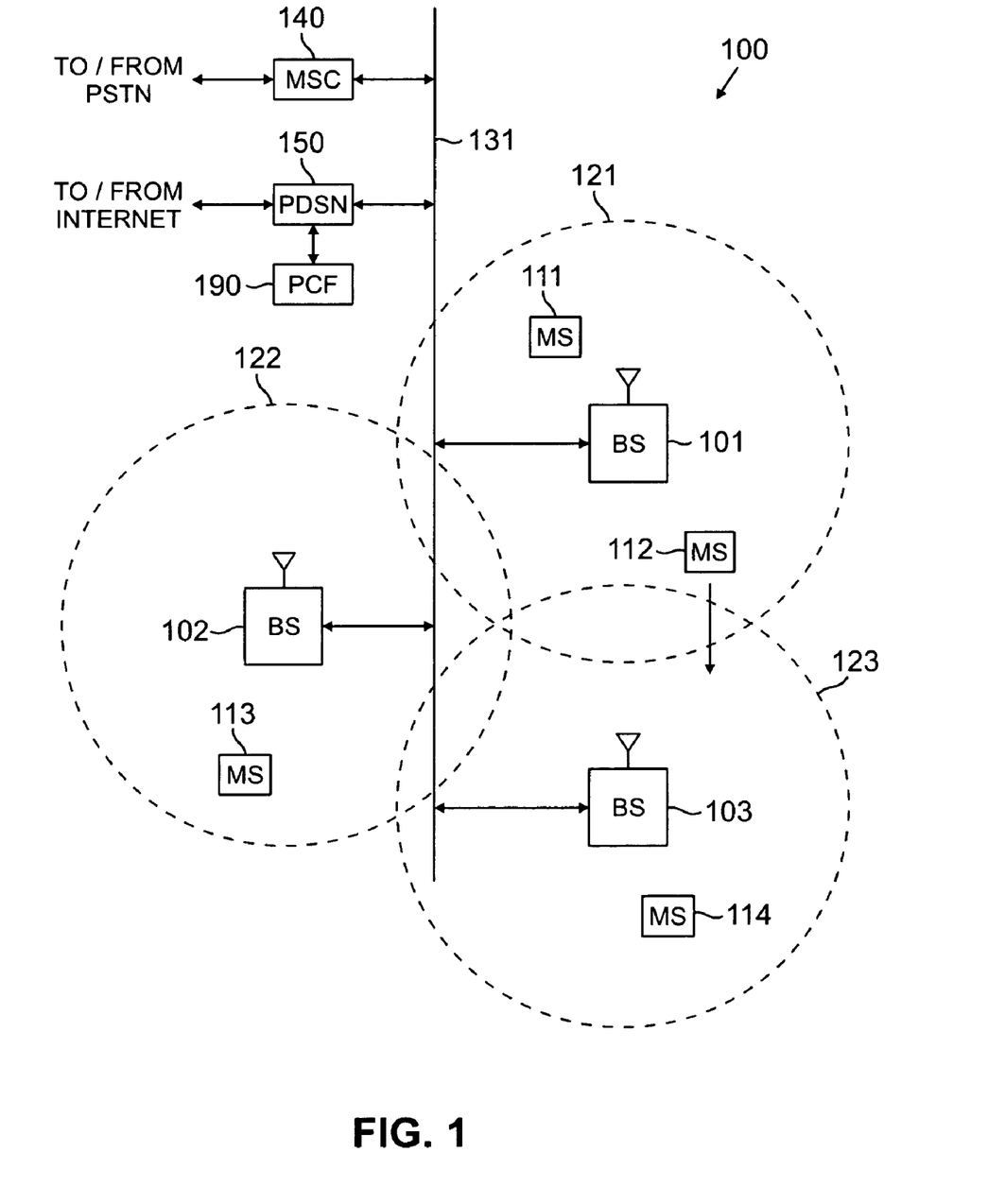
FIG. 1 illustrates an exemplary wireless network that is capable of providing peak scheduling according to an embodiment of the present disclosure.

FIG. 1 illustrates exemplary wireless network 100, in which peak scheduling may be provided according to the principles of the present disclosure. Wireless network 100 comprises a plurality of cells (or cell sites) 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Wideband-CDMA and CDMA2000 generally have multiple code channels, and each BS 101-103 transmits to each mobile station 111-114 in its coverage area using a dedicated code channel together with traffic power control for coping with channel fading. This results in co-channel interference even among mobile stations 111-114 within a same cell 121-123. Those systems have inferior system capacity as compared to systems using one aggregated channel together with rate control and opportunistic scheduling. The opportunistic scheduling scheme takes advantage of the nature of channel fading, rather than trying to correct the channel fading at the cost of RF resources. At each time, a BS 101-103 transmits to one mobile station 111-114 that happens to have favorable channel quality at that specific time. This is possible because rich fading environments generally have mobile stations 111-114 that are in good channel quality at any particular time instant.

Figure 4A:
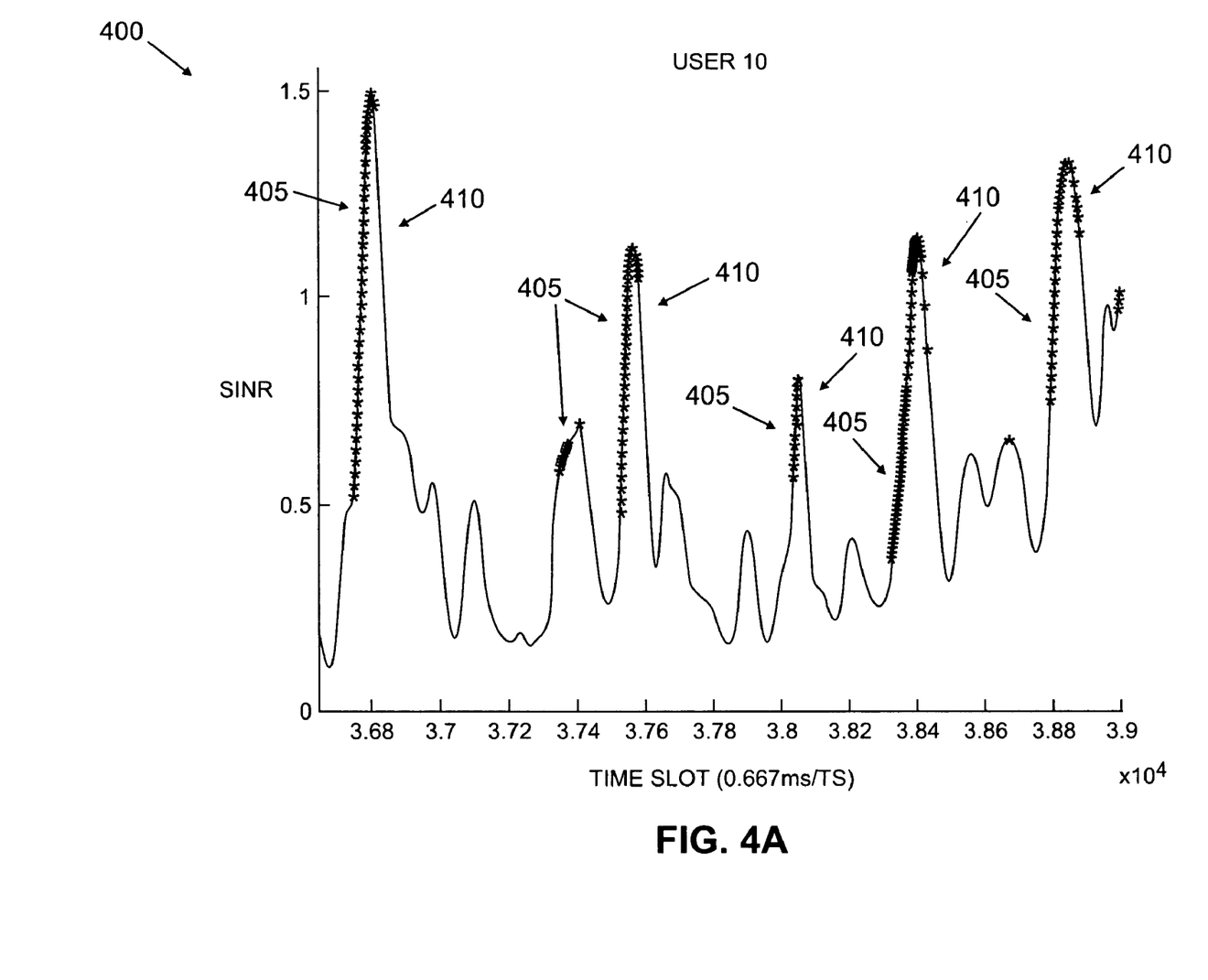
FIGS. 4A and 4B are graphs illustrating proportional fairness scheduling and peak scheduling, respectively, for a user in the wireless network of FIG. 1 according to an embodiment of the present disclosure.

Proportional fairness scheduling (PFS) is typically the default scheduling algorithm for many systems, such as 1×EV-DO, WCDMA Release 5 and 6, WiMAX, and the like. However, while PFS attempts to serve mobile stations 111-114 at the peaks of their channel quality, PFS actually schedules each mobile station 111-114 mostly at the ascending slope of its channel fading curve and interrupts service for the mobile station 111-114 upon reaching the peak of the curve, as illustrated in FIG. 4A and described in more detail below.

Figure 3:
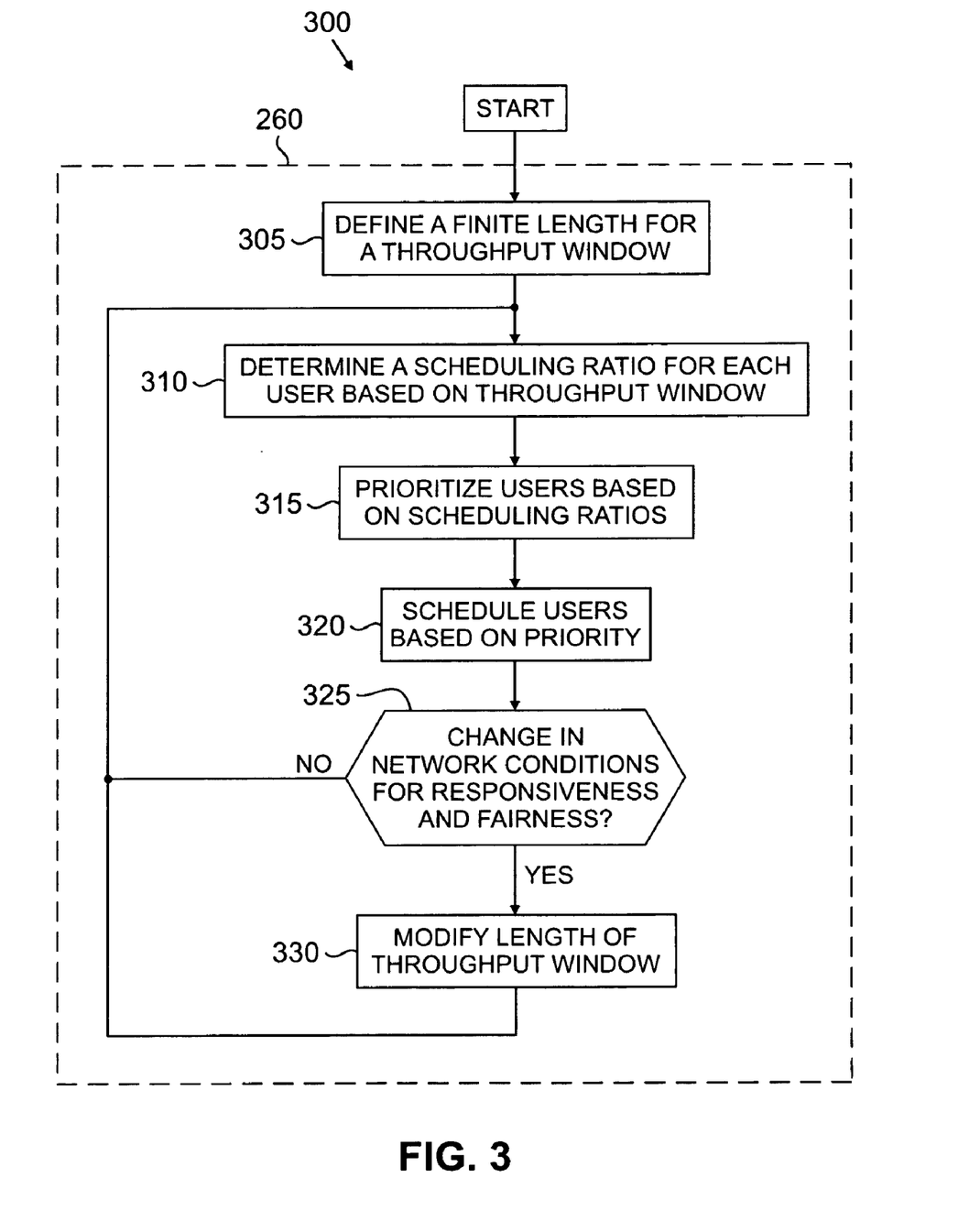
FIG. 3 is a flow diagram illustrating a method for providing peak scheduling by the base station of FIG. 2 according to an embodiment of the present disclosure.
Figure 4B:
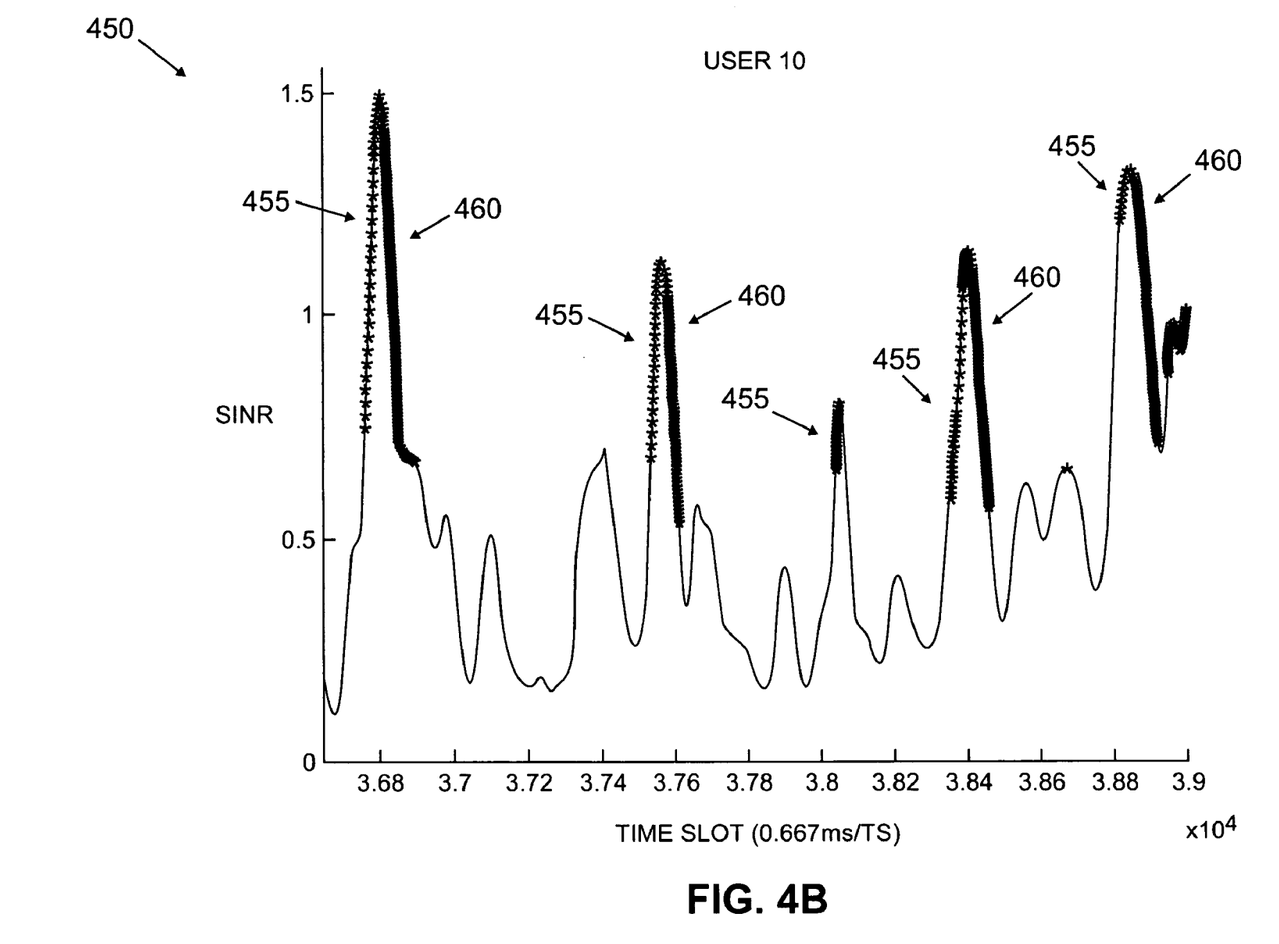

On the other hand, peak scheduling provided in accordance with the teachings of the present disclosure allows each BS 101-103 to schedule the mobile stations 111-114 at nearly equal amounts on both the ascending and descending slopes of most of the channel fading curves on which the mobile stations 111-114 are scheduled, as illustrated in FIG. 4B. As described in more detail below in connection with FIGS. 2-4, peak scheduling is possible when the BS 101-103 uses a finite window for calculating throughput values, as opposed to using an infinite window such as that used in PFS. Peak scheduling may be provided in many types of wireless networks 100, such as EV-DO/DV, HSDPA, WIMAX, WiBro, 3G Evolution, B3G, 4G, and the like.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In exemplary wireless network 100, MS 111 is located in cell 121 and is in communication with BS 101. MS 112 is also located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

Figure 2:
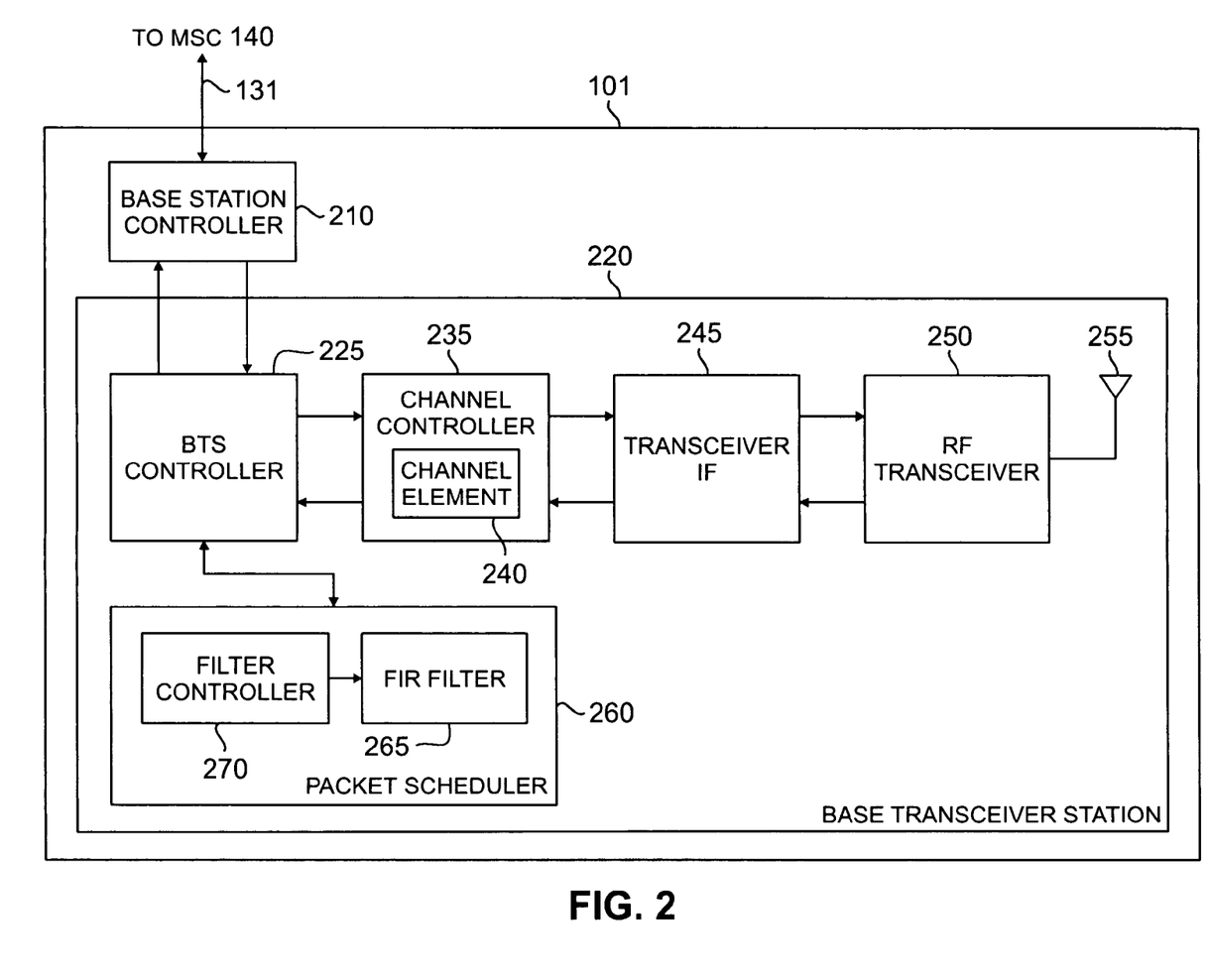
FIG. 2 illustrates an exemplary base station that is capable of scheduling transmissions according to an embodiment of the present disclosure.

FIG. 2 illustrates exemplary base station 101 in greater detail according to an exemplary embodiment of the present disclosure. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235 (which contains representative channel element 240), transceiver interface (IF) 245, RF transceiver 250, antenna array 255, and packet scheduler 260.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 235 and RF transceiver 250.

Antenna array 255 transmits forward channel signals received from RF transceiver 250 to mobile stations in the coverage area of BS 101. Antenna array 255 also sends to RF transceiver 250 reverse channel signals received from mobile stations in the coverage area of BS 101. In a preferred embodiment of the present disclosure, antenna array 255 is multi-sector antenna, such as a three-sector antenna in which each antenna sector is responsible for transmitting and receiving in a 120 degree arc of coverage area. Additionally, RF transceiver 250 may contain an antenna selection unit to select among different antennas in antenna array 255 during both transmit and receive operations.

Packet scheduler 260 is coupled to controller 225 and comprises a finite impulse response (FIR) filter 265 and an optional filter controller 270. Packet scheduler 260 is operable to schedule uplink and downlink communications for each mobile station 111-114 communicating with base station 101 based on a scheduling ratio that results in peak scheduling instead of proportional fairness scheduling. Although illustrated and described as two separate components, it will be understood that FIR filter 265 and filter controller 270 may be implemented together in a single component without departing from the scope of the present disclosure.

FIR filter 265 is operable to prioritize users of mobile stations 111-114 based on the scheduling ratio. As described in more detail below, the scheduling ratio is based on a throughput window of finite length. As a result, packet scheduler 260 is able to schedule each user at the peak, i.e., both the ascending slope and the descending slope, of the channel fading curve for the user, instead of mostly at the ascending slope. Filter controller 270 is coupled to FIR filter 265 and is operable to control the operation of FIR filter 265 by modifying the length of the throughput window used by FIR filter 265.

Proportional fairness scheduling (PFS) typically schedules users based on the following ratio:

$$\hat{k} = \underset{i}{\operatorname{argmax}} \frac{DRC_i(t)}{T_i(t - \Delta T)},$$

where $$T_i(t) = \left(1 - \frac{1}{\tau}\right) T_i(t - \Delta T) + \frac{1}{\tau} \delta_{i\hat{k}}(t) DRC_i(t).$$

$DRC_i(t)$ is the instantaneous supportable data rate, $T_i(t)$ is the exponentially moving average of the served data rates of User i, the constant $\tau$ is the window size of the moving average operation that is determined based on the maximum delay (i.e., $\tau \Delta T$) that can be tolerated by a corresponding application, $\Delta T$ is the time duration of each time slot (which is the minimum scheduling unit), the delta function $\delta_{i\hat{k}}(t)$ is one when $i=\hat{k}$ and zero otherwise, and $\hat{k}$ is an identifier for the selected User (the User with the largest ratio of the possible data rate versus the moving average of its past data rates).

PFS is based on the assumptions that $DRC_i(t)$ and $T_i(t-\Delta T)$ represent User i's current channel quality and channel quality history, respectively. In this case, the larger the ratio is, the more likely User i is close to a peak of its channel quality. Meanwhile, the delay of a user decreases its averaged data rates, thereby increasing its ratio. This in turn provides the user a higher probability of being served in the following time slots. Thus, PFS achieves fair performance similar to a round robin scheme, i.e., PFS results in serving all users almost the same number of time slots. In addition, the opportunistic scheduling feature also allows PFS to increase system throughput by 50 to 100 percent over that of a round robin scheme. However, as described above, PFS has the disadvantage of scheduling each user mostly at the ascending slope of its channel fading curve and interrupting service for the user upon reaching the peak of the curve.

Therefore, in accordance with the present disclosure, peak scheduling, instead of PFS, may be employed by packet scheduler 260 such that users may be scheduled based on the following scheduling ratio:

$$\hat{k} = \underset{i}{\operatorname{argmax}} \frac{DRC_i(t)}{R_i(t - \Delta T)},$$

where $$R_i(t) = R_i(t - \Delta T) + \delta_{i\hat{k}}(t) DRC_i(t) \Delta T.$$

$R_i(t)$ is User i's total throughput for a finite throughput window. As used herein, a "throughput window" is a finite length of time during which a plurality of throughputs are measured, each of which is weighted substantially equally in the scheduling ratio. For a particular embodiment, each of the measured throughputs is weighted equally.

Thus, instead of comparing a user's instantaneous channel state (i.e., $DRC_i(t)$) against its short-term channel history as in PFS, peak scheduling compares the user's instantaneous channel state against its long-term channel history. Although the total throughput is used in this embodiment to represent a user's long-term channel history, it will be understood that other suitable parameters may be used instead of total throughput, such as average past throughput or the like.

As a result, peak scheduling is able to correct the single-sided behavior of PFS because the long-term channel history does not change dramatically before and after the peak. In addition, the time slots in the vicinity of the peak have relatively high scheduling ratios as defined for peak scheduling, while the PFS ratio decreases dramatically right after a channel peaks. Furthermore, peak scheduling achieves higher system throughput than PFS because peak scheduling schedules a user at the global peaks while PFS schedules a user in many local, small peaks. Peak scheduling also provides fairness similar to a round robin scheme, as does PFS, because a user is picked up through the comparison of the scheduling ratios and a delayed user has a higher probability of being scheduled in the following time slots. Fairness such as packet-delay distribution is not sacrificed, either, and peak scheduling results in a higher aggregated system throughput than PFS because of the correction of the single-sided behavior.

Both PFS and peak scheduling deteriorate to the greedy scheduler if each user has the same statistics of channel fading, in which case the user with the highest channel quality is scheduled each time. In this case, each user still gets equal opportunities because of the identical fading statistics. However, PFS becomes the greedy scheduler (or the maximum-throughput scheduler) if the averaging period (i.e., $\tau$) is infinite. Thus, when users have different channel fading statistics, only users with the highest channel quality are scheduled without any fairness consideration. Peak scheduling, on the other hand, is independent of the averaging period and, thus, is able to maintain fairness in this situation.

Thus, FIR filter 265 is operable to calculate a long-term channel history using a finite impulse response filter such as that described above in connection with the scheduling ratio or other finite impulse response filter that provides a long-term channel history based on a finite throughput window. For a particular embodiment, FIR filter 265 is operable to weight equally each measured throughput within the finite throughput window, instead of weighting each measured throughput differently with an exponential decay as used in PFS. However, it will be understood that FIR filter 265 may weight some or all of the measured throughputs within the throughput window slightly differently without departing from the scope of the present disclosure.

Filter controller 270 is operable to modify the length of the throughput window in order to adjust the balance of responsiveness and fairness for packet scheduler 260. Thus, filter controller 270 may lengthen the throughput window, causing more weight to be given to the denominator of the scheduling ratio, which results in packet scheduler 260 becoming less responsive and more fair. However, if filter controller 270 shortens the throughput window, more weight is given to the numerator of the scheduling ratio, which results in packet scheduler 260 becoming more responsive and less fair.

Filter controller 270 may determine the length of the throughput window using any suitable criteria. For example, the speed of the mobile stations 111-114 may be considered when determining how to balance responsiveness versus fairness. In addition, it will be understood that filter controller 270 may be omitted in some embodiments in which the balance of responsiveness and fairness to be used is predetermined and unchangeable. For these embodiments, the length of the throughput window is not modified based on changing conditions in network 100.

FIG. 3 is a flow diagram illustrating a method 300 for providing peak scheduling by packet scheduler 260 of base station 101 according to an embodiment of the present disclosure. Although the method 300 is described with respect to base station 101, it will be understood that the method 300 may be performed by any suitable base station in network 100, such as base station 102 or 103.

Initially, filter controller 270 and/or an operator of base station 101 defines a finite length for a throughput window for use in peak scheduling by packet scheduler 260 (process step 305). It will be understood that the length of the throughput window may comprise any suitable finite length of time.

FIR filter 265 then determines a scheduling ratio for each user based on the throughput window (process step 310). For example, as described above in connection with FIG. 2, FIR filter 265 may determine the scheduling ratio for each user based on the following equations:

$$\hat{k} = \arg\max_i \frac{DRC_i(t)}{R_i(t - \Delta T)},$$

where $$R_i(t) = R_i(t - \Delta T) + \delta_{i\hat{k}}(t) DRC_i(t) \Delta T.$$

Based on the scheduling ratios, FIR filter 265 prioritizes the users (process step 315), and packet scheduler 260 schedules the users based on the prioritization (process step 320). Thus, for the above example, packet scheduler 260 may schedule the user with the maximum scheduling ratio as determined by FIR filter 265 using the above scheduling ratio.

For some embodiments in which filter controller 270 is operable to modify the length of the throughput window, filter controller 270 determines whether there has been a change in network conditions for responsiveness and/or fairness such that the balance should be adjusted (process step 325). For example, filter controller 270 may determine whether or not particular network conditions have surpassed a predetermined threshold, indicating that the balance should be adjusted. If filter controller 270 determines that there has been no such change in network conditions (process step 325), FIR filter 265 continues to determine scheduling ratios for the users based on the previous throughput window (process step 310) and the method continues as before.

However, if filter controller 270 determines that there has been such a change in network conditions (process step 325), filter controller 270 modifies the length of the throughput window in order to adjust the balance of responsiveness and fairness in scheduling performed by packet scheduler 260 (process step 330). At this point, FIR filter 265 begins to determine scheduling ratios for the users based on the modified throughput window (process step 310) and the method continues as before.

FIGS. 4A and 4B are graphs illustrating simulations of proportional fairness scheduling (PFS) 400 and peak scheduling 450, respectively, for a user in wireless network 100 according to an embodiment of the present disclosure. As shown in FIG. 4A, PFS 400 exhibits single-sided scheduling behavior, scheduling a user substantially at the ascending slopes 405 of the channel fading curve and rarely at the descending slopes 410. On the other hand, as shown in FIG. 4B, peak scheduling 450 exhibits double-sided scheduling behavior, scheduling a user at both the ascending slopes 455 of the channel fading curve and the descending slopes 460.

The simulation illustrated for both PFS 400 and peak scheduling 450 was conducted using the spatial channel model that has been widely used for evaluating 3GPP/3GPP2 proposals. The simulation includes one central cell 121-123 surrounded by six neighbor cells 121-123. Ten users are dropped randomly in the central cell 121-123, where each user experiences different channel fading with various channel statistics (e.g., mean channel quality). The curve represents the channel fading at the duration of 36650xTS for one particular user. The stars mark the time slots when the channel is allocated for the user.

For PFS 400, at the beginning of each ascending slope 405, the PFS ratio is high due to the ever-increasing current data rate and the small value of the moving average. As the user begins to be served, however, the average rate grows larger. Finally, just after the peak, the PFS ratio becomes smaller because the average rate has increased, which decreases the probability for serving the user. This single-sided behavior of PFS 400 can miss nearly half of the best opportunities for serving the user, which means that nearly half the time the user might be served in suboptimal conditions.

On the other hand, peak scheduling 450 provides double-sided behavior and is thereby able to serve the user in better conditions without missing the large amount of opportunities missed by PFS 400. In this way, the total system throughput is improved without compromising any of the users' throughputs. Instead, each user has a higher average throughput with peak scheduling 450 as compared to PFS 400. In addition, fairness performance is maintained with peak scheduling 450.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing peak scheduling in a wireless network, comprising:
   determining a priority for each of a plurality of users in the network based on a throughput window of a finite length using a scheduling ratio; and
   scheduling the users based on the priority, wherein the priority for each of the users is based on the scheduling ratio comprising:

$$\hat{k} = \operatorname*{argmax}_{i} \frac{DRC_i(t)}{R_i(t - \Delta T)},$$

where $$R_i(t) = R_i(t - \Delta T) + \delta_{i\hat{k}}(t) DRC_i(t) \Delta T$$

wherein DRCi(t) represents an instantaneous supportable data rate, Ti(t) represents an exponentially moving average of the served data rates of an User i, τ represents the window size of the moving average operation, ΔT represents the time duration of each time slot, $\delta_{i\hat{k}}(t)$ represents i=k̂ when $\delta_{i\hat{k}}(t)$ is one and zero otherwise, and k̂ represents an identifier for the selected User.

2. the method as set forth in claim 1, the scheduling ratio comprising an instantaneous channel state versus a long-term channel history for each of the users.

3. The method as set forth in claim 2, the long-term channel history comprising one of a total throughput and an average past throughput.

4. The method as set forth in claim 1, further comprising adjusting a balance between responsiveness and fairness in scheduling the users by modifying the length of throughput window.

5. The method as set forth in claim 1, further comprising:
   determining whether a change in conditions for the network has surpassed a predetermined threshold; and
   when the change in conditions for the network has surpassed the predetermined threshold, adjusting a balance between responsiveness and fairness in scheduling the users based on the change in conditions by modifying the length of the throughput window.

6. A method of providing peak scheduling in a wireless network, comprising:
   defining a finite length for a throughput window;
   determining a scheduling ratio for each of a plurality of users in the network based on the throughput window;
   prioritizing the users based on the scheduling ratios;
   scheduling the users based on the prioritization of the users;
   determining whether a change in conditions for the network has surpassed a predetermined threshold; and
   when the change in conditions for the network has surpassed the predetermined threshold, modifying the length of the throughput window, wherein the scheduling ratio comprises:

$$\hat{k} = \operatorname*{argmax}_{i} \frac{DRC_i(t)}{R_i(t - \Delta T)},$$

where $$R_i(t) = R_i(t - \Delta T) + \delta_{i\hat{k}}(t) DRC_i(t) \Delta T$$

wherein DRCi(t) represents an instantaneous supportable data rate, Ti(t) represents an exponentially moving average of the served data rates of an User i, τ represents the window size of the moving average operation, ΔT represents the time duration of each time slot, $\delta_{i\hat{k}}(t)$ represents i=k̂ when $\delta_{i\hat{k}}(t)$ is one and zero otherwise, and k̂ represents an identifier for the selected User.

7. The method as set forth in claim 6, the scheduling ratio comprising an instantaneous channel state versus a long-term channel history for each of the users.

8. The method as set forth in claim 7, the long-term channel history comprising one of a total throughput and an average past throughput.

9. A base station capable of providing peak scheduling in a wireless network, comprising a packet scheduler operable to provide double-sided scheduling for each of a plurality of users in the network by scheduling each of the users both at a substantial portion of an ascending slope of a channel fading curve for the user and at a substantial portion of a descending slope of the channel fading curve for the user, wherein the base station schedules users based upon a scheduling ratio:

$$\hat{k} = \operatorname*{argmax}_{i} \frac{DRC_i(t)}{R_i(t - \Delta T)},$$

where $$R_i(t) = R_i(t - \Delta T) + \delta_{i\hat{k}}(t) DRC_i(t) \Delta T.$$

wherein DRCi(t) represents an instantaneous supportable data rate, Ti(t) represents an exponentially moving average of the served data rates of an User i, τ represents the window size of the moving average operation, ΔT represents the time duration of each time slot, $\delta_{i\hat{k}}(t)$ represents k̂ when $\delta_{i\hat{k}}(t)$ is one and zero otherwise, and k̂ represents an identifier for the selected User.

10. The base station as set forth in claim 9, the packet scheduler comprising a finite impulse response (FIR) filter operable to determine a priority for each of the users based on a throughput window of a finite length, the packet scheduler further operable to provide scheduling for each of the users based on the priority for the user.

11. The base station as set forth in claim 10, the FIR filter operable to determine the priority for each of the users based on the throughput window by determining the priority for each of the users based on the scheduling ratio, the scheduling ratio based on the throughput window.

12. The base station as set forth in claim 11, the scheduling ratio comprising an instantaneous channel state versus a long-term channel history for each of the users.

13. The base station as set forth in claim 12, the long-term channel history comprising one of a total throughput and an average past throughput.

14. The base station as set forth in claim 10, the packet scheduler further comprising a filter controller coupled to the FIR filter, the filter controller operable to define a length for the throughput window.

15. The base station as set forth in claim 14, the filter controller further operable to adjust a balance between responsiveness and fairness in scheduling the users by modifying the length of the throughput window.

16. The base station as set forth in claim 10, the packet scheduler further comprising a filter controller coupled to the FIR filter, the filter controller operable to define a length for the throughput window, to determine whether a change in conditions for the network has surpassed a predetermined threshold and, when the change in conditions for the network has surpassed the predetermined threshold, to modify the length of the throughput window.

* * * * *

UNITED STATES PATENT AND TRADEMARK OFFICE
CERTIFICATE OF CORRECTION

PATENT NO. : 7,656,882 B2  
APPLICATION NO. : 11/476539  
DATED : February 2, 2010  
INVENTOR(S) : Ji et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this

Twenty-eighth Day of December, 2010

David J. Kappos  
*Director of the United States Patent and Trademark Office*